United States Patent [19]

Doi et al.

[11] 4,397,981

[45] Aug. 9, 1983

[54] ETHYLENE POLYMER COMPOSITIONS THAT ARE FLAME RETARDANT

[75] Inventors: Shuhei Doi; Tsutomu Isaka, both of Yokkaichi, Japan

[73] Assignee: Mitsubishi Petrochemical Company Limited, Tokyo, Japan

[21] Appl. No.: 217,461

[22] Filed: Dec. 17, 1980

[30] Foreign Application Priority Data

Dec. 28, 1979 [JP] Japan .................. 54-173284

[51] Int. Cl.$^3$ ............................................... C08K 5/02
[52] U.S. Cl. ......................... 524/465; 174/110 PM; 428/379; 428/391; 524/469; 524/472; 525/209; 525/326.5; 525/370; 526/279
[58] Field of Search ................. 174/110 S; 260/42.26, 260/45.7 RL; 525/288, 474, 479, 209; 526/279; 428/391; 524/469, 472, 465

[56] References Cited

U.S. PATENT DOCUMENTS

| | | | |
|---|---|---|---|
| 3,225,018 | 12/1965 | Zutty | 260/42.26 |
| 3,423,376 | 1/1969 | Gobran et al. | 260/42.26 |
| 3,646,155 | 2/1972 | Scott | 260/23 H |
| 3,832,326 | 8/1974 | North et al. | 260/42.15 |
| 4,117,195 | 9/1978 | Swarbrick et al. | 174/110 S |
| 4,209,566 | 6/1980 | Betts et al. | 174/110 S |
| 4,289,687 | 9/1981 | Hagiwara et al. | 260/45.7 RL |
| 4,291,136 | 9/1981 | Keogh | 428/391 |
| 4,297,310 | 10/1981 | Akutsu et al. | 526/279 |

*Primary Examiner*—Lorenzo B. Hayes
*Assistant Examiner*—R. A. White
*Attorney, Agent, or Firm*—Robert E. Burns; Emmanuel J. Lobato; Bruce L. Adams

[57] ABSTRACT

A novel flame-retardant ethylene polymer composition comprising a copolymer consisting essentially of ethylene and an olefinically unsaturated silane compound such as vinyltriethoxysilane, a silanol condensation catalyst such as dibutyltin dilaurate, and a flame retardant such as a chlorinated polyethylene.

9 Claims, No Drawings

ETHYLENE POLYMER COMPOSITIONS THAT ARE FLAME RETARDANT

BACKGROUND OF THE INVENTION

1. Field of the Art

This invention relates generally to ethylene polymer compositions. More particularly, it relates to an ethylene polymer composition comprising a copolymer comprising, as predominant monomeric units, ethylene and an olefinically unsaturated silane compound, a silanol condensation catalyst, and a flame retardant. The flame-retardant ethylene polymer composition of the present invention is suitably used, for example, for covering electric wires.

Conventional flame-retarded polyethylene resin compositions prepared by adding, to polyethylene resins, organic halogen compounds such as chlorinated paraffin or chlorinated naphthalene and antimony oxide and the like have been used for wiring materials within various apparatus and equipment, electric insulation materials, domestic articles, and other parts where there is a risk of over-heating or fire.

However, these conventional flame-retardant polyethylene resin compositions, the polyethylene resin component of which is not crosslinked, are readily heat-deformed or melted at the softening point of polyethylene or a higher temperature. The mechanical properties of such compositions deteriorate rapidly at such temperatures.

When these conventional compositions are used for wire-covering and the like, the above-mentioned problem is apt to give rise to other undesired problems such as thermal deformation and melting of the covering materials, due to the heat for soldering wiring systems within various equipment or to over-current heat due to equipment trouble. Thus, the imparting of heat resistance to these materials has been an important object to be achieved.

As one of the measures directed toward solving these problems, the use of a crosslinked polyethylene is generally practiced.

2. Prior Art

In one of such crosslinking methods, the polyethylene to be used is modified into a crosslinkable polyethylene by introducing a crosslinking group thereinto. In this case, it is also known to utilize a hydrolyzable silane group as the crosslinking group. This method comprises reacting polyethylene with an unsaturated silane compound in the presence of a free-radical yielding agent to obtain a graft copolymer and then contacting the resulting graft copolymer with moisture in the presence of a silanol condensation catalyst to effect crosslinking.

This method involves certain problems in that an additional step is required to graft-polymerize the unsaturated silane compound in advance, and a general-purpose polyethylene cannot be used as it is. The method, however, is advantageous on the following points over other crosslinking means such as irradiation or the use of free radicals formed by decomposition of organic peroxides and the like.

For example, the irradiation method requires a costly apparatus of special type and, moreover, it is actually not practicable for producing thick-walled or complicated molded articles. The method using organic peroxides requires a precise control between the activation temperature of organic peroxides adn the softening temperature of polyethylene resins. Since such a critical control of processing conditions may often be unachievable, the resulting resin compositions are apt to result in molded products of poor quality and sometimes result in failure of molding operations.

When the polyethylene graft-polymerized with the unsaturated silane compound is used, there has also been a problem in that the moldability of the resulting resin compositions is not always satisfactory and expecially unsatisfactory when flame retardants are incorporated into the compositions. The reasons for these problems have not been fully elucidated but are considered to be due to occurrence of unusual crosslinking reactions in the course of molding. Also in this case, there has been a problem in that the resulting resin compositions often result in the unsatisfactory appearance of molded products and sometimes result in the failure of molding operations.

SUMMARY OF THE INVENTION

An object of the present invention is to solve the above described problems. This object can be achieved by using as the precursor of the crosslinked polyethylene a copolymer of ethylene and an olefinically unsaturated silane compound.

Thus, the polyethylene resin composition of the present invention comprises:
(a) a copolymer comprising, as predominant monomeric units, ethylene and an olefinically unsaturated silane compound represented by the formula $RSiR'_nY_{3-n}$, in a proportion of 100 parts by weight.
(b) a silanol condensation catalyst in a proportion of 0.001 to 10 parts by weight.
(c) a flame retardant in a proportion of 10 to 150 parts by weight.

In the above formula: R is an ethylenically unsaturated hydrocarbyl or hydrocarbyloxy group; R' is an aliphatic saturated hydrocarbyl group; Y is a hydrolyzable organic group; and n is 0, 1 or 2.

The present invention uses a polyethylene resin into which an unsaturated silane compound has been introduced via copolymerization and not via graft-copolymerization (the term "a copolymer" used herein excluding a graft-copolymer), and thus has succeeded in solving the problems of poor moldability which was observed in molding graft-copolymers.

DETAILED DESCRIPTION OF THE INVENTION

1. Ethylene Copolymers

The unsaturated silane compound, which is an essential component of the copolymer comprising, as predominant monomeric units, ethylene and an ethylenically unsaturated silane compound, is represented by the following formula.

$$RSiR'_nY_{3-n}$$

wherein, R is an ethylenically unsaturated hydrocarbyl or hydrocarbyloxy group having, for example, 2 to 8 carbon atoms, R' is an aliphatic saturated hydrocarbyl group having, for example, 1 to 14 carbon atoms, Y is a hydrolyzable organic group such as an alkoxy group, acyloxy group or hydrocarbylamino group and n stands for 0, 1 or 2. When two or more Y groups are used, they may be the same or different from each other.

The unsaturated silane compounds are exemplified by the compounds wherein R is vinyl, allyl, propenyl, butenyl, cyclohexenyl, or γ-(meth)acryloxypropyl, Y is methoxy, ethoxy, formyloxy, acetoxy, propionoxy, or an alkyl- or arylamino, and R' is methyl, ethyl, propyl, decyl, or phenyl, and the like. "(Meth)acryloxypropyl" means acryloxypropyl or methacryloxypropyl. Preferred unsaturated silane compounds are represented by the following formulas.

wherein A is a hydrocarbyl group having 1 to 8 carbon atoms and more preferably 1 to 4 carbon atoms.

The most preferred silane compounds include vinyltrimethoxysilane, vinyltriethoxysilane and γ-methacryloxypropyltrimethoxysilane.

The copolymerization of ethylene and the unsaturated silane compound can be carried out under any conditions under which these monomers will undergo copolymerization.

More specifically, the copolymerization is carried out by contacting these monomers simultaneously or stepwisely in an autoclave or a tube-reactor, preferably in an autoclave, under a pressure of 500 to 4,000 kg/cm$^2$, preferably, 1,000 to 4,000 kg/cm$^2$, and at a temperature of 100° to 400° C., preferably 150° to 350° C., in the presence of a radical polymerization initiator and, if desired, up to about 30% by weight of a comonomer copolymerizable with ethylene and a chain-transfer agent.

In the present invention, any radical polymerization initiator, any comonomer and any chain transfer agent which have been known to be employed in the polymerization of ethylene or copolymerization thereof with other monomers can be used.

Examples of radical polymerization initiators which can be used are (a) organic peroxides such as lauroyl peroxide, dipropionyl peroxide, benzoyl peroxide, di-t-butyl peroxide, t-butylhydroperoxide, and t-butyl peroxy-isobutyrate, (b) molecular oxygen, and (c) azo compounds such as azobisisobutyronitrile and azoisobutylvaleronitrile. Examples of comonomers which can be used are (a) vinyl esters such as vinyl acetate, vinyl butyrate and vinyl pivalate, (b) unsaturated carboxylic acids such as acrylic acid, methacrylic acid, maleic anhydride and fumaric acid, (c) acrylates or methacrylates such as methyl (meth)acrylate, and butyl (meth)acrylate, (d) vinyl esters such as vinyl methyl ether and vinyl phenyl ether, and (e) derivatives of acrylic or methacrylic acid such as acrylonitrile and methacryl amide. The indication "(meth)acrylate" means acrylate or methacrylate. Examples of chain transfer agents which can be used are (a) paraffin hydrocarbons such as methane, ethane, propane, butane, hexane and heptane, (b) α-olefins such as propylene, butene-1 and hexene-1, (c) aldehydes such as formaldehyde, acetaldehyde and n-butyl aldehyde, (d) ketones such as acetone, methyl ethyl ketone and cyclohexanone, (e) aromatic hydrocarbons, and (f) halogenated hydrocarbons.

A copolymer to be used in the present composition contains 0.001 to 15%, preferably 0.01 to 5%, and most preferably 0.01 to 2% by weight, of the unsaturated silane compound units. In general, the higher the content of the unsaturated silane compound in the copolymer used, the greater is the compatibility of the resulting composition with fillers and the higher are the mechanical strength and heat resistance of molded articles which are later crosslinked in the presence of water.

However, when the content of the silane compound is excessively high, the tensile elongation and moldability of the resulting composition are lowered. The above-mentioned range of 0.001 to 15% by weight has been determined in this respect.

The copolymer may be diluted with olefin polymers and/or other polymers. In this case, the content of the silane compound unit should be in the range of 0.001 to 15% by weight of the total weight of these polymer components. The quantity of the olefin polymers and other polymers to be added for dilution is preferably not more than about 70% by weight, as will be further explained in detail.

2. Silanol Condensation Catalysts

The silanol condensation catalysts to be used in the present invention are generally those which can be used as catalysts for promoting dehydration condensation between silanol groups of silicones. Such silanol condensation catalysts are typically salts of carboxylic acids and metals or alkylmetals such as tin, zinc, iron, lead and cobalt; organic bases, inorganic acids; and organic acids.

Specific examples of these silanol condensation catalysts are: metal or alkylmetal carboxylates such as dibutyltin dilaurate, dibutyltin diacetate, dibutyltin dioctoate, stannous acetate, stannous caprylate, lead naphthenate, zinc caprylate and cobalt naphthenate; organic bases such as ethylamine, dibutylamine, hexylamine and pyridine; inorganic acids such as sulfuric acid and hydrochloric acid; and organic acids such as toluenesulfonic acid, acetic acid, stearic acid and maleic acid.

The quantity of the silanol condensation catalyst to be used can be appropriately determined by a person carrying out the process as to a given catalyst for a given copolymer by reference to the working examples shown below. Generally speaking, the quantity of catalyst to be added to the composition is in the range of 0.0001 to 10%, preferably 0.01 to 5%, and more preferably 0.01 to 3% by weight, of the weight of copolymer in the composition.

3. Flame Retardants

A flame retardant to be used in the present composition may be any flame retardant known in the art, provided that it is compatible or miscible with the ethylene-unsaturated silane copolymer.

In general, organic halogen compounds wherein halogen is chlorine, bromine or iodine are suitably used as the retardant. From the viewpoint of exudation or evaporation of the retardant from the composition, an organic halogen compound having a comparatively large molecular weight is suitable. Organic or inorganic halogen compounds such as halogen-containing resin materials, which have excessively large molecular weights or poor compatibility but can be dispersed into the copolymers as finely divided powder, can also be used.

The preferred retardants having good compatibility with the present copolymers and good flame retardance are, for example, organic halogen compounds such as chlorinated paraffin, chlorinated polyethylene, ethylene-vinyl acetate-vinyl chloride copolymer, chlorinated naphthalene, hexabromobenzene, tetrabromobisphenol A, and perchloropentacyclodecane. The compound can be used alone or in combination.

The quantity of the retardant used in the present invention is normally in the range of 10 to 150%, preferably 20 to 120%, by weight of the copolymer.

The organic halogen compounds can be used concomitantly with flame-retardant adjuvants to enhance their flame-retardant performance. Such adjuvants for the organic halogen compounds can be those compounds which react at a high temperature with the halogen contained in the organic halogen compounds and generate non-combustible gases and include inorganic compounds and especially metal oxides such as antimony trioxide, zirconium oxide and the like. The quantity of such flame-retardant adjuvants to be used concomitantly is in the range of 10 to 100% by weight of the organic halogen compound.

On the other hand, there is another type of flame-retardant adjuvants which enhance flame retardance without reaction with the halogen contained in the organic halogen compounds. In this case, the flame retardants are not required to be organic halogen compounds. Such flame retardant adjuvants can be selected from inorganic fillers known in the art. The fillers which can be added to resin materials are well known, and a variety of such fillers can be used in the present composition. Typical examples of such adjuvants include talc, alumina, aluminum hydroxide, silica, calcium carbonate and the like. The quantity of the flame-retardant adjuvants of this class to be used is not more than 50% by weight of the copolymer.

4. Preparation of the Compositions

The composition of the present invention can be prepared, for example, by any of the following processes.

The above-mentioned components (if desired, together with stabilizers, pigments and other auxiliary materials) are kneaded and blended in a conventional kneader such as extruders, rolls, Banbury mixers and Brabenders at the melting point of the copolymer component or higher temperature.

The silanol condensation catalyst can be mixed as it is and by itself into the copolymer. It is convenient, however, to prepare a master batch wherein a high concentration of a silanol condensation catalyst is formulated with a dispersion medium such as polyethylene and then to add the master batch to the copolymer in such a quantity as to produce the desired concentration.

Alternatively, the copolymer (or a mixture consisting essentially of the copolymer and an unmodified polyolefin) and the flame retardant is molded into a desired product, and the resulting molded piece is then soaked in a solution or dispersion containing the silanol condensation catalyst to impregnate or surface-coat it with the catalyst.

The composition of the present invention is fundamentally a resinous composition. Thus, it can contain, if desired, a variety of auxiliary materials which can be incorporated into such compositions. Such auxiliary materials include, for example, pigments, lubricants, antioxidants, nucleating agents, blowing agents, and ultraviolet protective agents.

Another group of auxiliary materials which can be added to the present composition are polymer or resin materials compatible or miscible therewith. Such polymers are to constitute the molded product of the present composition together with the ethylene-unsaturated silane compound copolymer but are conveniently classified as auxiliary materials since they are not essential components of the present composition. Specific examples of such polymers are low-, medium-, and high-density polyethylenes, polypropylene, chlorinated polyethylene, copolymers of ethylene and copolymerizable monomers such as vinyl acetate, methyl acrylate, propylene, butene, and hexene. The quantity of such polymers to be added is up to 70% by weight of the total weight of the polymer and the copolymer component of the present invention.

5. Crosslinking

The molded product of the present composition is exposed to water to subject it to crosslinking reaction. The exposure to water is carried out by contacting the molded product with water (in liquid or vapor state) at room temperature to about 200° C., generally at room temperature to 100° C., for a period of 10 seconds to about 1 week, generally 1 minute to about 1 day, under pressure if desired. In order to wet the molded product sufficiently, water may contain wetting agents or surface active agents, water-soluble organic solvent, or the like. Water to be used may be in the state of ordinary water, heated steam, atmospheric moisture, or some other state. Incidentally, the present composition can be prepared and molded under exposure to water, and thus the crosslinking reation can be conducted simultaneously with the preparation and molding of the composition.

6. Evaluation on flame-retardant properties

The flame retardant properties of the present composition can be expressed as an oxygen index of the crosslinked composition. The term "oxygen index" used herein is determined in accordance with Japanese Industrial Standards JIS K7201.

In general, a composition having an oxygen index of 18 to 21 is referred to as having a flame spreading property, a composition of an oxygen index of 22 to 25 as having a self-inflammable property, and a composition having an oxygen index of 26 or more as having a flame retardant property. The crosslinked composition of the present invention has an oxygen index of more than 21, preferably 22 or more, and more preferably 26 or more.

EXAMPLES 1 and 2

An autoclave of 1.5-liter capacity equipped with a stirrer was charged with a mixture of ethylene, vinyltrimethoxysilane in one instance and vinyltriethoxysilane in another instance and propylene used as a chain transfer agent, and further with t-butylperoxyisobutyrate. Thus, two kinds of ethylene-unsaturated silane compound copolymers(copolymers A and B, respectively) were prepared under a pressure of 2,400 kg/cm$^2$ and at a temperature of 220° C. The polymerization conditions and properties of the resulting copolymers are shown in Table 1.

A mixture of each resulting copolymer with chlorinated paraffin (chlorine content 70% by weight), antimony trioxide and tribasic lead sulfate was kneaded in a roll mill at a temperature of 140° C. for 7 minutes, which step was followed by addition of 1% by weight of dibutyl tin dilaurate (and the balance amount thereof as a catalyst master batch containing low-density polyethylene "YUKALON EH-30" which is the same as the polyethylene used in the following Reference Examples). The resulting composition was extruded by an extruder of an L/D ratio of 25 and a diameter of 40 mm. The degree of crosslinking of the extruded products immediately after the extrusion and the properties of the extruded products which had been cross-linked by soaking them in hot water at 90° C. for 1 day were measured. The results are shown in Table 2.

REFERENCE EXAMPLES 1 AND 2

Into a low-density polyethylene having a melt index of 2 g/10 minutes and a density of 0.919 g/cc ("YUKA-LON" supplied by Mitsubishi Petrochemical Company, Japan) were dispersed 2% by weight of vinyltrimethoxysilane in one instance and vinyltriethoxysilane in another instance and 0.1% by weight of dicumyl peroxide. Each resulting mixture was processed by means of an extruder of an L/D ratio of 24 and a diameter of 50 mm at a temperature of 200° C. to graft-polymerize the mixture.

Each of the resulting silicone-graft polyethylenes (the former of the two being referred to as Graft A and the latter as Graft B) was subjected to extrusion by using the same additive formulations and processes as in Examples 1 and 2. The extrusion operation was difficult since crosslinking proceeded in the course of kneading and extrusion. The results are shown in Table 2.

0.01 to 5% by weight based on the weight of the copolymer of an olefinically unsaturated silane compound represented by the formula, $$RSiR_n'Y_{3-n}$$

wherein: R is an ethylenically unsaturated hydrocarbyl or hydrocarbyloxy group; R' is an aliphatic saturated hydrocarbyl group; Y is a hydrolyzable organic group; and n is 0, 1 or 2, said copolymer being obtained by radical copolymerization of said monomeric ethylene and said silane compound in the presence of a radical initiator under elevated pressure,
(b) 0.001 to 10 parts by weight of a silanol condensation catalyst, and
(c) 10 to 150 parts by weight of a flame retardant which is an organic halogen compound wherein the halogen is chlorine, bromine or iodine.

2. The composition as claimed in claim 1 in which the ethylenically unsaturated silane compound is selected from the group consisting of:

$$CH_2=CHSi(OA)_3 \text{ and}$$

$$CH_2=C(CH_3)COOC_3H_6Si(OA)_3$$

TABLE 1

| | Polymerization Conditions | | | | | | Properties of Copolymers | |
|---|---|---|---|---|---|---|---|---|
| | Pressure (kg/cm$^2$) | Temperature (°C.) | Quantity of ethylene supplied (kg/hr) | Quantity of vinylsilane supplied (g/hr) | Quantity of propylene supplied (lit./hr) | Quantity of polymerization initiator supplied (g/hr) | Conversion (%) | melt[*1] index (g/10 min) | content[*2] % vinylsilane (% by weight) |
| Copolymer A | 2400 | 220 | 43 | [*3] 130 | 400 | 2.2 | 15 | 1.0 | 0.51 |
| Copolymer B | 2400 | 220 | 43 | [*4] 150 | 350 | 2.1 | 15 | 1.0 | 0.58 |

Note:
[*1]: JIS K6760
[*2]: analysis by fluorescent X-ray method
[*3]: vinyltrimethoxysilane
[*4]: vinyltriethoxysilane

TABLE 2

| | | Examples: | | | |
|---|---|---|---|---|---|
| | | Example 1 | Example 2 | Reference Example 1 | Reference Example 2 |
| Composition (% by weight) | | | | | |
| Copolymer (a) | Copolymer A | 50 | — | — | — |
| based on (a) | Copolymer B | — | 80 | — | — |
| + (b) | Graft A | — | — | 50 | — |
| | Graft B | — | — | — | 80 |
| Flame retardant (b) based | Chlorinated paraffin HB (from Teijin[*1] | 50 | — | 50 | — |
| on (a) + (b) | Kasei, Japan) | — | 20 | — | 20 |
| Antimony trioxide based on (a) | | 10 | 10 | 10 | 10 |
| Tribasic lead sulfate based on (a) | | 1 | 2 | 1 | 2 |
| Catalyst master batch based on (a) | | 5 | 10 | 5 | 10 |
| Moldability | | | | | |
| Percent gelation immediately after extrusion (% by weight)[*2] | | 0 | 0 | 34 | 42 |
| Appearance of extruded products | | good | good | not good[*3] | not good |
| Properties of crosslinked composition | | | | | |
| Percent gelation after treatment with warm water (% by weight)[*2] | | 47 | 66 | 46 | 67 |
| Oxygen index[*4] | | 26 | 27 | not measurable | |

Note:
[*1]: organic bromine compound
[*2]: % by weight of residues after having been extracted for 10 hours with boiling xylene
[*3]: very uneven surface
[*4]: in accordance with JIS K7201

What is claimed is:
1. An ethylene polymer composition which comprises:
(a) 100 parts by weight of a copolymer comprising, as predominant monomeric units ethylene and about wherein A is a hydrocarbyl group having 1 to 8 carbon atoms.

3. The composition as claimed in claim 1 in which the silanol condensation catalyst is a metal or alkylmetal carboxylate.

4. The composition as claimed in claim 1 in which said ethylenically unsaturated silane compound is $CH_2=CHSi(OA)_3$, wherein A is a hydrocarbyl group having 1 to 8 carbon atoms.

5. The composition as claimed in claim 1 in which said ethylenically unsaturated silane compound is $CH_2=C(CH_3)COOC_3H_6Si(OA)_3$, wherein A is a hydrocarbyl group having 1 to 8 carbon atoms.

6. The cross-linked flame-retardant composition obtained by contacting the composition defined in claim 1 with water.

7. A method for producing a flame-retardant ethylene polymer composition comprising
copolymerizing ethylene with an unsaturated silane monomer of the formula $RSiR'_nY_{3-n}$ wherein: R is an ethylenically unsaturated hydrocarbyl or hydrocarbyloxy group; R' is an aliphatic saturated hydrocarbyl group; Y is a hydrolyzable organic group; and n is 0, 1 or 2 at a pressure of about 500 to 4,000 kg./cm., at temperature of about 100° to 400° C., in the presence of a radical polymerization initiator and in proportions such that the resultant polymer contains about 0.01 to 5% by weight of said silane monomer;
adding to 100 parts by weight of the resultant copolymer 0.001 to 10 parts by weight of a silanol condensation catalyst and 10 to 150 parts by weight of a flame-retardant which is an organic halogen compound wherein the halogen is chlorine, bromine or iodine;
molding the copolymer composition and exposing the copolymer composition to water to effect a cross-linking reaction during or after the molding of said copolymer composition.

8. The process claimed in claim 7 in which the ethylenically unsaturated silane compound is selected from the group consisting of:

$CH_2=CHSi(OA)_3$ and $CH_2=C(CH_3)COOC_3H_6Si(OA)_3$ wherein A is a hydrocarbyl group having 1 to 8 carbon atoms.

9. The process as claimed in claim 7 in which the silanol condensation catalyst is a metal or alkylmetal carboxylate.

* * * * *